(12) United States Patent
Scott et al.

(10) Patent No.: US 8,518,319 B2
(45) Date of Patent: Aug. 27, 2013

(54) PROCESS OF MAKING FIBERS BY ELECTRIC-FIELD-DRIVEN SPINNING USING LOW-CONDUCTIVITY FLUID FORMULATIONS

(75) Inventors: Ashley S. Scott, Grove City, OH (US); Andrew L. Washington, Jr., Pataskala, OH (US); John A. Robertson, Chillicothe, OH (US)

(73) Assignee: Nanostatics Corporation, Circleville, OH (US)

( * ) Notice: Subject to any disclaimer, the term of this patent is extended or adjusted under 35 U.S.C. 154(b) by 231 days.

(21) Appl. No.: 12/728,070

(22) Filed: Mar. 19, 2010

(65) Prior Publication Data

US 2010/0239861 A1    Sep. 23, 2010

Related U.S. Application Data

(60) Provisional application No. 61/161,498, filed on Mar. 19, 2009, provisional application No. 61/256,873, filed on Oct. 30, 2009.

(51) Int. Cl.
*D06M 10/00* (2006.01)
*H05B 7/00* (2006.01)

(52) U.S. Cl.
USPC ........................................................ 264/465

(58) Field of Classification Search
USPC .................................. 264/464, 465, 466, 484
See application file for complete search history.

(56) References Cited

U.S. PATENT DOCUMENTS

| | | | |
|---|---|---|---|
| 1,975,504 A | 10/1934 | Formhals | |
| 2,160,962 A | 6/1939 | Formhals | |
| 2,187,306 A | 1/1940 | Formhals | |
| 2,323,025 A | 6/1943 | Formhals | |
| 2,349,950 A | 5/1944 | Formhals | |
| 4,284,594 A * | 8/1981 | Joh et al. | 264/41 |
| 7,591,883 B2 * | 9/2009 | Kameoka et al. | 264/466 X |

(Continued)

FOREIGN PATENT DOCUMENTS

| | | | |
|---|---|---|---|
| JP | 2008069478 A * | 3/2008 | |
| KR | 10-2005-0062683 | 6/2005 | |

(Continued)

OTHER PUBLICATIONS

U.S. Appl. No. 13/118,409, filed May 28, 2011, Scott et al, co-owned.

(Continued)

*Primary Examiner* — Leo B Tentoni
(74) *Attorney, Agent, or Firm* — David S. Alavi

(57) ABSTRACT

A first method comprises: dissolving a polymer in a terpene, terpenoid, or aromatic solvent to form a polymer solution; dissolving a salt in a polar organic solvent to form a salt solution; and mixing the salt solution and the polymer solution to form a mixture. The salt and the polar organic solvent do not cause substantial precipitation of the polymer upon mixing with the polymer solution. A resulting terpene, terpenoid, or aromatic solvent phase of the mixture is suitable for forming fibers by electric-field-driven spinning from one or more spinning tips onto a target substrate. A composition comprises the terpene, terpenoid, or aromatic solvent phase of the mixture resulting from the method. A second method comprises forming fibers by electric-field-driven spinning of the first composition from one or more spinning tips onto a target substrate. A second composition comprises the fibers formed by the second method.

20 Claims, 1 Drawing Sheet

(56) References Cited

U.S. PATENT DOCUMENTS

| | | |
|---|---|---|
| 2005/0025974 A1* | 2/2005 | Lennhoff ................ 264/465 X |
| 2005/0073075 A1 | 4/2005 | Chu et al. |
| 2005/0104258 A1* | 5/2005 | Lennhoff ................ 264/465 |
| 2005/0224998 A1 | 10/2005 | Andrady et al. |
| 2006/0057377 A1 | 3/2006 | Harrison et al. |
| 2007/0116640 A1 | 5/2007 | Kim et al. |
| 2008/0113214 A1 | 5/2008 | Davis et al. |
| 2008/0131615 A1 | 6/2008 | Robertson et al. |
| 2012/0004370 A1 | 1/2012 | Scott et al. |

FOREIGN PATENT DOCUMENTS

| | | |
|---|---|---|
| WO | WO 2005/026398 | 3/2005 |
| WO | WO 2005/090653 | 9/2005 |
| WO | WO 2008/073662 | 6/2008 |
| WO | WO 2009/030355 | 3/2009 |

OTHER PUBLICATIONS

International Search Report and Written Opinion dated Nov. 4, 2010 for counterpart App No. PCT/US2010/028019.
Deery et al; Rapid Comm Mass Spec; v 11, p. 57 (1997).
Li et al; Advanced Materials; v 16, n. 14, p. 1151 (2004).
Subbiah et al; J Appl Polymer Sci; v 96, p. 557 (2005).
Huang et al; Composite Sci & Tech; v 63, p. 2223 (2003).
Pattamaprom et al; Macromol Materials & Eng; v 291, p. 840 (2006).
Toshima et al; J Macromol Sci A; v 25, p. 1349 (1988).
Sharma et al; Polymer Int'l; v 25, p. 167 (1991).
Korkut et al; Phys Rev Lett; v 100, p. 034503 (2008).
Tripatanasuwan et al; Polymer; v 50, p. 1835 (2009).
Keki et al; Rapid Comm Mass Spec; v 15, p. 675 (2001).
Hattori et al; Adv Polymer Tech; v 27, p. 35 (2008).
Hattori et al; J Wood Sci; (2009).
Eda et al; Eur Polymer J; v 43, p. 1154 (2007).
Hayati; Collis & Surfaces; v 65, p. 77 (1992).
Hayati et al; J Colloid Interface Sci; v 117, p. 205 (1987).
Hayati et al; J Colloid Interface Sci; v 117, p. 222 (1987).
Hohman et al; Physics of Fluids; v 13, p. 2201 (2001).
Hohman et al; Physics of Fluids; v 13, p. 2221 (2001).
Han et al; Polymer Degradation & Stability; v 86, p. 257 (2004).
Shin et al; Polymer; v 42, p. 9955 (2001).
Moon et al; J Appl Polymer Sci; v 109 p. 691 (2008).
Morget et al; NASA Report TM-2005-213786 (2005).
Taylor; Proc R Soc London A; v 280, p. 383 (1964).
International Search Report and Written Opinion dated Feb. 9, 2012 for co-owned App No. PCT/US2011/038470.
Zhang et al; IEEE Power Modulator and High Voltage Conference; p. 221 (May 27, 2010).
Lin et al; Nanotechnology; vol. 15 p. 1375 (Aug. 13, 2004).
Yuh et al; Materials Letters; vol. 59 p. 3645 (Jul. 21, 2005).

* cited by examiner

PROCESS OF MAKING FIBERS BY ELECTRIC-FIELD-DRIVEN SPINNING USING LOW-CONDUCTIVITY FLUID FORMULATIONS

BENEFIT CLAIMS TO RELATED APPLICATIONS

This application claims benefit of (i) U.S. provisional App. No. 61/161,498 entitled "Electrospinning Cationic Polymers and Method" filed Mar. 19, 2009 and (ii) U.S. provisional App. No. 61/256,873 entitled "Electrospinning with reduced current or using fluid of reduced conductivity" filed Oct. 30, 2009, both of said provisional applications being hereby incorporated by reference as if fully set forth herein.

BACKGROUND

The field of the present invention relates to electric-field-driven spinning of polymer nanofibers (e.g., electrospinning) or spraying of small droplets (e.g., electrospraying). In particular, fluid formulations for electric-field-driven (EFD) spinning with relatively reduced fluid conductivity are disclosed herein.

The subject matter disclosed herein may be related to subject matter disclosed in co-owned U.S. non-provisional application Ser. No. 11/634,012 entitled "Electrospraying/electrospinning array utilizing a replacement array of individual tip flow restriction" filed Dec. 5, 2006 in the names of John A. Robertson and Ashley Steve Scott (now U.S. Pat. No. 7,629,030), said application being incorporated by reference as if fully set forth herein.

"Electrospinning" and "electrospraying" refer to the production of, respectively, so-called "nanofibers" or "nanodroplets", which may be "spun" as fibers or "sprayed" as droplets by applying high electrostatic fields to one or more fluid-filled spraying or spinning tips (i.e., nozzles or spinnerets). The high electrostatic field typically (at least when using a relatively conductive fluid) produces a Taylor cone at each tip opening from which fibers or droplets are ejected. The sprayed droplets or spun fibers are typically collected on a target substrate. A high voltage supply provides an electrostatic potential difference (and hence the electrostatic field) between the spinning tip (usually at high voltage) and the target substrate (usually grounded). A number of reviews of electrospinning have been published, including (i) Huang et al, "A review on polymer nanofibers by electrospinning and their applications in nanocomposites," *Composites Science and Technology*, Vol. 63, pp. 2223-2253 (2003), (ii) Li et al, "Electrospinning of nanofibers: reinventing the wheel?", *Advanced Materials*, Vol. 16, pp. 1151-1170 (2004), (iii) Subbiath et al, "Electrospinning of nanofibers," *Journal of Applied Polymer Science*, Vol. 96, pp. 557-569 (2005), and (iv) Bailey, *Electrostatic Spraying of Liquids* (John Wiley & Sons, New York, 1988). Details of conventional electrospinning materials and methods can be found in the preceding references and various other works cited therein, and need not be repeated here.

Conventional fluids for electrospinning (melts, solutions, colloids, suspensions, or mixtures, including many listed in the preceding references) typically possess significant fluid conductivity (e.g., ionic conductivity in a polar solvent, or a conducting polymer). Fluids conventionally deemed suitable for electrospinning have conductivity typically between 100 µS/cm and about 1 S/cm (Filatov et al; *Electrospinning of Micro-and Nanofibers*; Begell House, Inc; New York; 2007; p 6). It has been observed that electrospinning of nanometer-scale fibers using conventional fluids typically requires conductivity of about 1 mS/cm or more; lower conductivity typically yields micron-scale fibers. In addition, conventional methods of electrospinning typically include a syringe pump or other driver/controller of the flow of fluid to the spinning tip, and a conduction path between the high voltage supply and the fluid to be spun. Such arrangements are shown, for example, in U.S. Pat. Pub. No. 2005/0224998 (hereafter, the '998 publication), which is incorporated by reference as if fully set forth herein. In FIG. 1 of the '998 publication is shown an electrospinning arrangement in which high voltage is applied directly to a spinning tip, thereby establishing a conduction path between the high voltage supply and the fluid being spun. In FIGS. 2, 5, 6A, and 6B of the '998 publication are shown various electrospinning arrangements in which an electrode is placed within a chamber containing the fluid to be spun, thereby establishing a conduction path between the high voltage supply and the fluid. The chamber communicates with a plurality of spinning tips. In any of those arrangements, significant current (typically greater than 1 µA per spinning tip) flows along with the spun polymer material. Conventional electrospinning fluids are deposited on metal target substrates so that current carried by the spun material can flow out of the substrate, thereby avoiding charge buildup on the target substrate. Electrospinning onto nonconductive or insulating substrates has proved problematic due to charge buildup on the insulating substrate that eventually suppresses the electrospinning process.

SUMMARY

A first method comprises: dissolving a polymer in a terpene, terpenoid, or aromatic solvent to form a polymer solution; dissolving a salt in a polar organic solvent to form a salt solution; and mixing the salt solution and the polymer solution to form a mixture. The salt and the polar organic solvent do not cause substantial precipitation of the polymer upon mixing with the polymer solution. A resulting terpene, terpenoid, or aromatic solvent phase of the mixture is suitable for forming fibers by electric-field-driven spinning from one or more spinning tips onto a target substrate. A first composition comprises the terpene, terpenoid, or aromatic solvent phase of the mixture resulting from the first method. A second method comprises forming fibers by electric-field-driven spinning of the first composition from one or more spinning tips onto a target substrate. A second composition comprises the fibers formed by the second method.

Objects and advantages pertaining to electric-field-driven (EFD) spinning may become apparent upon referring to the exemplary embodiments illustrated in the drawings and disclosed in the following written description or appended claims.

Figure 1:
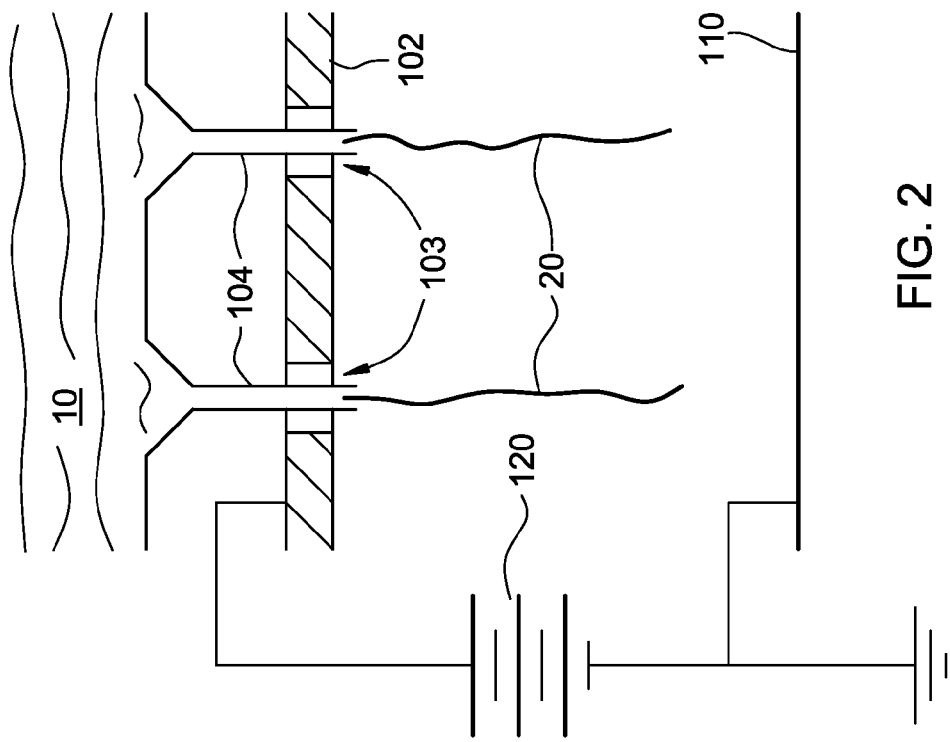
FIGS. 1 and 2 illustrate schematically exemplary spinning heads for electric-field-driven spinning.

The embodiments shown in the Figures are exemplary, and should not be construed as limiting the scope of the present disclosure or appended claims.

DETAILED DESCRIPTION OF EMBODIMENTS

Electrospinning or electrospraying of polymer-containing nanofibers or small droplets, respectively, can be employed to produce a variety of useful materials. However, scaling up an electrospinning process beyond the laboratory or prototype level has proven problematic. To achieve production-type quantities, multiple electrospinning tips are typically employed in an arrayed arrangement. However, the conductive fluids used and the significant current (typically greater than 1 µA per tip) carried by fibers emerging from each tip lead to impractically large overall current and to undesirable electrostatic interactions among the electrospinning tips and fibers; these limit the number and density of electrospinning tips that can be successfully employed.

Electrospinning fluids are disclosed herein that exhibit substantially reduced conductivity relative to conventional electrospinning fluids (while maintaining suitability for electrospinning), at least partly mitigating the undesirable electrostatic interactions described above. The physical mechanism underlying fiber formation by spinning can vary between conventionally conductive fluids and the less conductive spinning fluids disclosed herein. Therefore, the terms employed are LiCl, $CuCl_2$, $AgNO_3$, and $FeCl_3$; other suitable inorganic salts can be employed. Salt concentrations in DMF can be: greater than about 0.01% salt by weight, typically greater than about 0.02% salt by weight, and preferably greater than about 0.05% salt by weight; and less than about 10% salt by weight, typically less than about 5% salt by weight, and preferably less than about 1% salt by weight. The PS/DL solution and the salt/DMF solution are mixed in a selected proportion. At higher salt concentrations or higher salt solution proportions, the resulting mixture phase-separates over a period of several hours to several days (into separate fluid layers, sometimes also with a solid precipitate). The salt/DMF-treated PS/DL (the phase-separated PS/DL layer, if phase separation occurs; the entire mixture if not) is used as the electrospinning fluid. The table below summarizes some observed results using PS/DL treated with salt/DMF in various proportions. The conductivity of the salt/DMF-treated PS/DL is about 13 µS/cm in each example.

| wgt % PS/DL | salt | wgt % salt/DMF | % salt/PS solns | visc | avg fiber dia |
|---|---|---|---|---|---|
| 30% | LiCl | 5% wgt | 10% vol | 1640 cps | no data |
| 30% | LiCl | 5% wgt | 20% vol | 1200 cps | no data |
| 30% | LiCl | 5% wgt | 30% vol | 990 cps | 552.5 nm |
| 30% | $AgNO_3$ | 5% wgt | 30% vol | 795 cps | 516.7 nm |
| 30% | LiCl | 5% wgt | 30% wgt | 325 cps | 289 nm |
| 30% | $CuCl_2$ | 5% wgt | 30% wgt | 540 cps | 224 nm |

"electric-field-driven spinning" (EFD spinning) and "electrospinning" shall be employed to describe the general phenomenon of fiber formation by ejecting fluid from a nozzle tip under the influence of an applied electric field, regardless of the underlying physical mechanism.

One group of electrospinning fluids exhibiting reduced conductivity comprises mixtures of (i) a solution of polystyrene in D-limonene and (ii) an inorganic salt dissolved in dimethyl formamide. Polystyrene (PS) is a non-polar, non-conductive polymer; D-limonene (DL) is a relatively high-boiling, low vapor pressure, non-polar solvent that occurs naturally in citrus rinds. D-limonene is attractive as a "green," or environmentally friendly, organic solvent, and is readily available in large quantities as a byproduct of citrus processing. Conventional electrospinning has been attempted using a solution of PS in DL, but it has been observed that the resulting fibers are relatively large (about 700 nm) and of poor quality (Shin et al, "Nanofibers from recycle waste expanded polystyrene using natural solvent," *Polymer Bulletin*, Vol. 55 pp. 209-215 (2005)).

Treatment of the PS/DL solution with a solution of inorganic salt in dimethyl formamide (DMF) markedly improves the quality of nanofibers produced by electrospinning a PS/DL fluid. In various examples of preparation of the electrospinning fluids, a PS/DL solutions can be prepared that are: greater than 10% PS by weight, typically greater than about 15% or 20% PS by weight, or preferably greater than about 25% PS by weight; and less than about 50% PS by weight, typically less than about 40% PS by weight, and preferably less than about 35% PS by weight. In several examples, a solution of about 30% PS by weight in DL was employed. The measured conductivity of the 30% PS/DL solution is about 0.0 µS/cm and the viscosity is about 3125 cps. As noted above, the PS/DL solution does not produce nanofibers of satisfactory size or quality when used as the electrospinning fluid.

The polymer solution (PS/DL) is treated with a solution of inorganic salt in DMF. Examples of salts that can be Another exemplary salt/DMF-treated PS/DL comprises a solution of 30% by weight of PS (mw 192 k, atactic) dissolved in DL and combined with a solution of $CuCl_2$ dissolved in DMF, with the amounts of $CuCl_2$ and DMF chosen to yield about a 3:1 mole ratio of $CuCl_2$ to PS and about a 1:1 mole ratio of DMF to DL. The resulting mixture does not phase separate and is used as an electrospinning fluid in exemplary embodiments described hereinbelow, wherein nanofibers between about 250 nm and about 300 nm are consistently produced. More generally, the amount of salt solution can be chosen to result in a mole ratio between about 2:1 and about 1:4 of the polar organic solvent to the terpene, terpenoid, or aromatic solvent in the mixture, typically between about 1:1 and about 1:3

The electrospinning of the fluids described above (conductivity less than 100 µS/cm, typically less than about 75 µS/cm or less than about 50 µS/cm, and preferably less than about 20 µ/cm) typically exhibit electrospinning characteristics that differ substantially from those of conventional electrospinning fluids (conductivity greater than 100 µS/cm, and typically about 1 mS/cm or greater to spin nanofibers). Nanofibers can be spun from the salt/DMF-treated PS/DL onto insulating substrates (e.g., Mylar®, Typar®, paper, and so forth) as well as onto conducting substrates. The flow rate during spinning of the salt/DMF-treated PS/DL electrospinning fluid is substantially larger than that of conventional electrospinning fluids (20-500 µL/min/nozzle while producing nanofibers of less than 500 nm diameter, versus 1-2 µL/min/nozzle for conventional fluids). The current carried by the spun nanofibers is substantially reduced for the salt-DMF-treated PS/DL (less than about 0.3 µA/nozzle versus greater than about 1 µA/nozzle for conventional fluids). The nanofibers produced by electrospinning the salt/DMF-treated PS/DL typically spread over a smaller area when spun than nanofibers spun from conventional electrospinning fluids (e.g., a spot about 0.5 inch in diameter versus about 2 inches in diameter when spun from a nozzle about 7 inches from the target substrate). In contrast to nanofibers produced by conventional electrospinning fluids, which can vary widely in their diameter (for example, from less than 200 nm to greater than 1 μm) based on operating conditions such as voltage or flow rate, electrospinning the salt/DMF-treated PS/DL fluid typically produces nanofibers, e.g., within a range between about 200 nm and about 300 nm over a wider range of operating conditions. In one example, electrospinning with a fluid head pressure of about 1 psi and an applied voltage of 80 kV results in a flow rate of about 59 μL/min/nozzle and fibers of about 278 nm average diameter. In another example, the same pressure and flow rate with an applied voltage of 40 kV yields fibers of about 282 nm average diameter. In yet another example, applying a fluid head pressure of about 10 psi and applying about 80 kV results in a flow rate of about 135 μL/min/nozzle and fibers of about 235 nm average diameter.

Alternative terpene, terpenoid, or aromatic solvents can be employed to form the polymer solution with polystyrene. Alternative polar organic solvents (including mixtures) can be employed to form the salt solution. In some examples, fibers have been formed by EFD spinning using salt/DMF-treated solutions of polystyrene in D-limonene, p-cymene (PC), terpinolene (T), and α-terpinene (AT). In other examples, fibers have been formed by EFD spinning using polymer solutions treated with salt solutions employing DMF, methyl ethyl ketone (MEK) or N-methyl-2-pyrrolidone (NMP). In other examples, fibers have been formed by EFD spinning using polymer solutions with salt solutions employing cetyl-trimethyl-ammonium bromide (CTAB), 1-butyl-3-methyl-imidazolium hexafluorophosphate (BMIHP), LiCl, AgNO$_3$, CuCl$_2$, or FeCl$_3$. Polar organic solvents having a dielectric constants greater than about 15 or preferably greater than about 30 can be advantageously employed as the polar organic solvent (or as a component thereof, if the polar organic solvent is a mixture).

The following are exemplary formulations of fluids suitable for EFD spinning of fibers. The terpene, terpenoid, or aromatic solvent is referred to generically as "nonpolar solvent" in the table. Of the formulations in the table, only the first example phase separates; its top, predominantly PS/DL layer was used to form fibers by EFD spinning. The other examples remained as single phase mixtures after mixing the respective polymer and salt solutions, and the single phase mixtures were used to form fibers by EFD spinning. In addition to the abbreviations given above, in the following table PS100, PS192, and PS350 designate polystyrene having an average molecular weight of 100,000, 192,000, and 350,000 g/mole, respectively. It appears from the data that the viscosity of the spinning fluid has a relatively greater influence on spun fiber diameter than does polymer molecular weight. Spinning fluid formulations having viscosity less than about 1000 cps produce spun fibers typically less than about 500 nm average diameter. In contrast, one trial formulation having a viscosity of 3137 cps yielded spun fibers having average diameters ranging from about 748 nm to about 1198 nm.

| PS | nonpolar solvent | wgt % PS | polar solvent | salt | wgt % salt | polar/ nonpolar moles | visc. (cps) | avg. fiber dia. (nm) |
|---|---|---|---|---|---|---|---|---|
| 1143 g PS192 | 2667 g DL | 30% | 2280 g DMF | 120 g CuCl$_2$ | 5% | 1.59:1 | 540 cps | 224 nm |
| 3402 g PS192 | 7938 g DL | 30% | 4457 g DMF | 8.4 g CuCl$_2$ | 0.19% | 1.05:1 | 250 cps | 279 nm |
| 30.0 g PS192 | 70.0 g PC | 30% | 40.0 g DMF | 0.074 g CuCl$_2$ | 0.18% | 1.05:1 | 212 cps | 160-180 nm |
| 30.0 g PS192 | 70.0 g T | 30% | 39.4 g DMF | 0.074 g CuCl$_2$ | 0.19% | 1.05:1 | 265 cps | 161-179 nm |
| 30.0 g PS192 | 70.0 g AT | 30% | 39.4 g DMF | 0.074 g CuCl$_2$ | 0.19% | 1.05:1 | 186 cps | 220-238 nm |
| 20.0 g PS100 | 80.0 g DL | 20% | 45.0 g DMF | 0.095 g CuCl$_2$ | 0.21% | 1.05:1 | 82 cps | 118-194 nm |
| 45.0 g PS100 | 105.0 g DL | 30% | 59.0 g DMF | 0.215 g CuCl$_2$ | 0.36% | 1.05:1 | 406 cps | 268-382 nm |
| 30.0 g PS192 | 70.0 g DL | 30% | 39.4 g DMF | 0.074 g CuCl$_2$ | 0.19% | 1.05:1 | 196 cps | 162-216 nm |
| 40.0 g PS192 | 74.4 g DL | 35% | 41.5 g DMF | 0.10 g CuCl$_2$ | 0.24% | 1.04:1 | 393 cps | 221-362 nm |
| 60.0 g PS192 | 90.0 g DL | 40% | 50.5 g DMF | 0.149 g CuCl$_2$ | 0.29% | 1.05:1 | 915 cps | 329-455 nm |
| 25.0 g PS350 | 75.0 g DL | 25% | 25.0 g DMF | 0.034 g CuCl$_2$ | 0.14% | 1.04:1 | 182 cps | 149-232 nm |
| 30.0 g PS350 | 70.0 g DL | 30% | 39.4 g DMF | 0.041 CuCl$_2$ | 0.10% | 1.05:1 | 484 cps | 239-350 nm |
| 22.5 g PS192 | 52.5 g DL | 30% | 29.5 g DMF | 0.52 g BMIHP | 1.7% | 1.05:1 | 203 cps | 105-122 nm |
| 22.5 g PS192 | 52.5 g DL | 30% | 7.0 g DMF | 0.08 g BMIHP | 1.13% | 1:4 | 663 cps | 337-480 nm |

Alternative polymers can be employed; examples of candidate polymers include but are not limited to: polystyrene, styrene butadienes, other aromatic side chain polymers, polymethylmethacrylate (PMMA) or other acrylate polymers, polyvinylchloride (PVC), other non-polar or non-conductive polymers, or copolymers or derivatives thereof. Alternative solvents can be employed for dissolving the polymer; examples of candidate solvents include but are not limited to: D-limonene or limonene derivatives (e.g., carveol or carvone); other terpene-based solvents or terpenoid derivatives (e.g., α-pinene, β-pinene, 2-pinanol, camphene, α-myrcene, cis-α-ocimene, linalool, nerol, geraniol, citronellol, Υ-terpinene, α-phellandrene, p-cymene, terpinolene (1,4(8)-menthadiene), isolimonene (2,8-menthadiene), ψ-limonene (1(7),8-menthadiene), or 1(7),4(8)-menthadiene); aromatic solvents (e.g., benzene, toluene, xylenes, and so forth); other similar solvents; or mixtures thereof. Alternative salts can be employed; examples include but are not limited to inorganic salts (e.g., LiCl, AgNO$_3$, CuCl$_2$, or FeCl$_3$), ionic liquids (e.g., an imidazolium salt such as 1-butyl-3-methyl-imidazolium hexafluorophosphate), or ionic surfactants (e.g., a quaternary ammonium salt such as cetyl-trimethyl-ammonium bromide). In addition to treating the polymer solution so that it spins, silver salts can also impart desirable antimicrobial properties onto the deposited electrospun nanofibers. Alternative solvents can be employed for dissolving the salt to treat the non-polar polymer solution that preferably do not reduce the solubility of the polymer in its solvent; examples include but are not limited to: DMF, methyl ethyl ketone (MEK), N-methyl-2-pyrrolidone (NMP), or mixtures thereof. Polar organic solvents can be employed (alone or as a component of a solvent mixture) that have a dielectric constant greater than about 15, or preferably greater than about 30. Any of the preceding alternative can be employed in any suitable combination. Factors for selection of a suitable combination of polymer and solvents can include: miscibility of the terpene, terpenoid, or aromatic solvent with the polar organic solvent; sufficient solubility of the polymer in the terpene, terpenoid, or aromatic solvent; high boiling point or low vapor pressure of the terpene, terpenoid, or aromatic solvent to reduce evaporation at the spinning tips (and consequent buildup of polymer on the tip); no substantial precipitation of the polymer from the mixture of polymer and salt solutions; or sufficiently large dielectric constant of the polar organic solvent or a component thereof.

Figure 2:
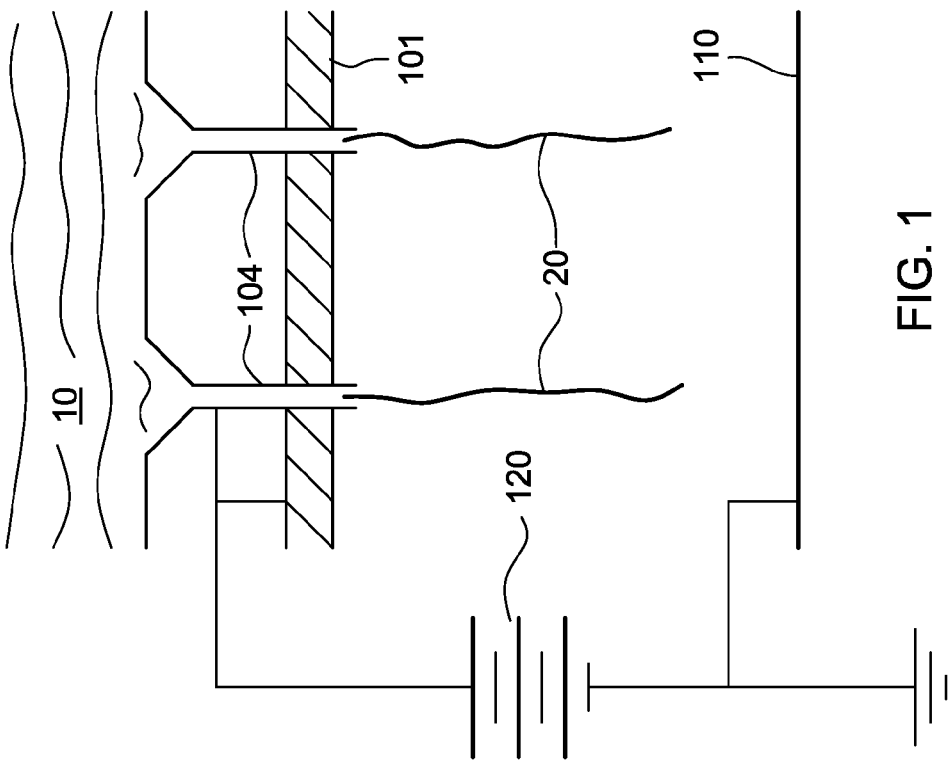

The electrospun nanofibers disclosed above were formed using a conventional electrospinning arrangement, in which a conduction path is established between the electrospinning fluid 10 and the target 110 through the high voltage supply 120 (through contact with the fluid 10 and/or the spinning tips 104; as in the example of FIG. 1). The electric field between the plate 101 and the target 110 drives the EFD spinning. However, the salt/DMF-treated PS/DL electrospinning fluid 10 can also undergo EFD spinning to form fibers 20 without any electrical conduction path to the fluid (i.e., if the fluid 10 and the spinning nozzles 104 are electrically isolated, which means both from the voltage supply 120 and from ground). In the example of FIG. 2, the high voltage that drives the EFD spinning process is applied across the target 110 and a plate, screen, or mesh 102 that is electrically insulated from the electrospinning fluid 10 and provided with one or more passages or perforations 103 for the electrospinning nozzles 104. The nozzles 104 are electrically insulated from the plate, grid, or mesh 102 and are arranged to convey the electrospinning fluid 10 through the passages 103, whether flush with (not shown) or extending through (FIG. 2) the plate, grid, or mesh 102. The applied electrostatic field drives the electrospinning process, but with substantially less current flow per nozzle and substantially less charge deposited onto the target substrate, relative to the conventional arrangement with a conductive path. In the isolated-nozzle arrangement of FIG. 2, the nozzles 104 can be formed from an suitable insulating material (e.g., Teflon®, polyethylene, ceramic, glass, and so on). Various suitable arrangements for EFD spinning without a conduction path to the spinning fluid (i.e., in an isolated-nozzle or isolated-fluid arrangement, e.g., as in FIG. 2) are disclosed in provisional App No. 61/256,873, already incorporated herein.

Conventional fluids have been observed to undergo electrospinning without a conduction path between the fluid and the high voltage supply. It has been observed qualitatively that such isolated-nozzle spinning with conventional fluids requires up to four times the applied voltage to initiate electrospinning (e.g., 60 kV versus 15 kV), produces a substantial, readily visible and audible corona discharge near the nozzle (versus only a audible corona discharge), and deposits substantially more surface charge onto an insulating target substrate (loud, visible spark when discharged versus no audible or visible discharge) compared to isolated-nozzle electrospinning with salt/DMF-treated PS/DL.

Using a spinning head that provides contact between the high voltage supply and the spinning fluid, a salt/DMF-treated PS/DL fluid (the non-phase-separating composition described above) was used for EFD spinning of fibers onto an insulating Mylar® target substrate, onto a non-insulating scrim substrate, onto an aluminum foil target substrate (in each of those three cases with the substrate resting on a conductive ground plate, screen, or mesh), and onto an electrically isolated aluminum foil target substrate. In all cases a head pressure of about 0.5 psi was applied to the fluid in the reservoir and the flow rate was about 5.7 µL/min/nozzle. As shown in the table below, when electrospinning a salt/DMF-treated PS/DL fluid, varying the voltage or the nature of the target substrate has remarkably little effect on the average size of the resulting nanofibers. Similar fiber sizes (about 250-300 nm) were obtained when fibers were formed by EFD spinning of the salt/DMF-treated PS/DL (non-phase separated composition) from electrically isolated nozzles.

| substrate | voltage | avg fiber diameter |
|---|---|---|
| scrim on ground plate | 40 kV | 264.8 nm |
| scrim on ground plate | 60 kV | 239.8 nm |
| scrim on ground plate | 74 kV | 237.0 nm |
| scrim on ground plate | 90 kV | 254.1 nm |
| Mylar ® on ground plate | 75 kV | 288.1 nm |
| Mylar ® on ground plate | 76 kV | 252.4 nm |
| Mylar ® on ground plate | 80 kV | 254.6 nm |
| Mylar ® on ground plate | 90 kV | 247.0 nm |
| aluminum foil (grounded) | 71 kV | 251.7 nm |
| aluminum foil (isolated) | 71 kV | 254.3 nm |

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof shall be construed as open ended terminology, with the same meaning as if the phrase "at least" were appended after each instance thereof.

In the appended claims, if the provisions of 35 USC §112 ¶ 6 are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112 ¶ 6 are not intended to be invoked for that claim.

What is claimed is:

1. A method comprising:
dissolving a polymer in a terpene, terpenoid, or aromatic solvent to form a polymer solution;
dissolving a salt in a polar organic solvent to form a salt solution;
mixing the salt solution and the polymer solution to form a mixture;
allowing a terpene, terpenoid, or aromatic solvent phase of the mixture to phase separate from the mixture;
removing the phase separated terpene, terpenoid, or aromatic solvent phase from the mixture; and
after removing the phase separated terpene, terpenoid, or aromatic solvent phase from the mixture, using the terpene, terpenoid, or aromatic solvent phase of the mixture to form fibers by electric-field-driven spinning from one or more spinning tips onto a target substrate,
wherein:
the salt and the polar organic solvent do not cause substantial precipitation of the polymer upon mixing with the polymer solution;
the terpene, terpenoid, or aromatic solvent phase of the mixture has an electrical conductivity less than 100 μS/cm; and
the terpene, terpenoid, or aromatic solvent phase of the mixture is suitable for forming the fibers by electric-field-driven spinning from the one or more spinning tips onto the target substrate.

2. The method of claim 1 wherein the polymer comprises polystyrene.

3. The method of claim 1 wherein the terpene, terpenoid, or aromatic solvent comprises D-limonene, p-cymene, terpinene, or terpinolene.

4. The method of claim 1 wherein the polar organic solvent comprises one or more of dimethyl formamide, methyl ethyl ketone, or N-methyl-2-pyrrolidone.

5. The method of claim 1 wherein the polar organic solvent includes a solvent having a dielectric constant greater than about 15.

6. The method of claim 1 wherein the polar organic solvent includes a solvent having a dielectric constant greater than about 30.

7. The method of claim 1 wherein the salt comprises an inorganic salt, an ionic liquid, or an ionic surfactant.

8. The method of claim 1 wherein the salt comprises a quaternary ammonium salt, an imidazolium salt, LiCl, $AgNO_3$, $CuCl_2$, or $FeCl_3$.

9. The method of claim 1 wherein the polymer comprises polystyrene, the terpene, terpenoid, or aromatic solvent comprises D-limonene, the polar organic solvent comprises dimethyl formamide, and the salt comprises cetyl-trimethyl-ammonium bromide, 1-butyl-3-methyl-imidazolium hexafluorophosphate, LiCl, $AgNO_3$, $CuCl_2$, or $FeCl_3$.

10. The method of claim 1 wherein the terpene, terpenoid, or aromatic solvent phase of the mixture has a viscosity less than about 1000 centipoise.

11. The method of claim 1 wherein the polymer solution is between about 15% and about 40% by weight of the polymer, the salt solution is between about 0.02% and about 5% by weight of the salt, and the mixture has a mole ratio between about 2:1 and about 1:4 of the polar organic solvent to the terpene, terpenoid, or aromatic solvent in the mixture.

12. The method of claim 1 wherein the spinning tips and the terpene, terpenoid, or aromatic solvent phase of the mixture are electrically isolated from a voltage source that drives the electric-field-driven spinning.

13. The method of claim 1 wherein the spinning tips or the terpene, terpenoid, or aromatic solvent phase of the mixture are in electrical contact with a voltage source that drives the electric-field-driven spinning.

14. The method of claim 1 wherein the target substrate is electrically insulating.

15. The method of claim 1 wherein the target substrate is electrically isolated.

16. The method of claim 1 wherein the terpene, terpenoid, or aromatic solvent phase of the mixture has an electrical conductivity less than about 75 μS/cm.

17. The method of claim 1 wherein the terpene, terpenoid, or aromatic solvent phase of the mixture has an electrical conductivity less than about 50 μS/cm.

18. The method of claim 1 wherein the terpene, terpenoid, or aromatic solvent phase of the mixture has an electrical conductivity less than about 20 μS/cm.

19. The method of claim 1 wherein the fibers formed have an average diameter less than about 500 nm.

20. The method of claim 1 wherein a magnitude of electrical current carried by the formed fibers is less than about 0.3 μA per spinning tip.

* * * * *